United States Patent [19]
Griesemer et al.

[11] Patent Number: 5,359,191
[45] Date of Patent: Oct. 25, 1994

[54] CROSS-AISLE PHOTO-DETECTOR FOR MOBILE STORAGE SYSTEM HAVING A LIGHT DETECTOR MOUNTED TO THE MOVABLE STORAGE UNIT

[75] Inventors: Patrick J. Griesemer, Greenfield; William B. McHenry, Sun Prairie, both of Wis.

[73] Assignee: Spacesaver Corporation, Fort Atkinson, Wis.

[21] Appl. No.: 48,619

[22] Filed: Apr. 16, 1993

[51] Int. Cl.[5] .............................................. G01V 9/04
[52] U.S. Cl. ................... 250/221; 250/222.1; 312/201
[58] Field of Search ................... 250/221, 222.1, 561; 312/201, 200, 198, 199; 414/936, 331, 222

[56] References Cited
U.S. PATENT DOCUMENTS

| | | |
|---|---|---|
| 4,693,184 | 9/1987 | Peterman . |
| 4,733,923 | 3/1988 | Dahnert . |
| 4,743,078 | 5/1988 | Dahnert . |
| 4,744,307 | 5/1988 | Peterman et al. . |
| 4,745,516 | 5/1988 | Griffin . |
| 5,121,975 | 6/1992 | Dahnert . |
| 5,260,582 | 11/1993 | Danek et al. ............. 250/556 |
| 5,266,812 | 11/1993 | Mokuo .................... 250/561 |

*Primary Examiner*—David C. Nelms
*Assistant Examiner*—Que T. Le
*Attorney, Agent, or Firm*—Ryan, Kees & Hohenfeldt

[57] ABSTRACT

A presence detector for use with a mobile storage system including at least a first movable storage unit with a prime mover adapted to move the shelving unit along a path of movement, and at least one blocking object, such as a second movable storage unit, a stationary storage unit or a wall, positioned on the path. The presence detector detects the presence of an obstacle in the path of movement and discontinues movement of the first unit while the obstacle is in the path of movement. The presence detector includes at least one light source mounted to either the first unit or the blocking object so as to provide light into the path of movement. At least one light detector is mounted to the blocking object or first unit, respectively, opposite the light source. A control unit is connected to the light detector and receives a signal from the light detector, that signal indicating whether or not the light detector is receiving light from the light source. The control unit disables the prime mover from moving the first storage unit along the path when the signal is received from the light detector indicating that light is not being received from the light source. The control unit includes the capability to determine which of several detectors was last screened, so that the prime mover is not re-enabled if the last detector screened was more than a predetermined distance from the end of the aisle.

17 Claims, 1 Drawing Sheet

CROSS-AISLE PHOTO-DETECTOR FOR MOBILE STORAGE SYSTEM HAVING A LIGHT DETECTOR MOUNTED TO THE MOVABLE STORAGE UNIT

BACKGROUND OF THE INVENTION

This invention relates to mobile storage systems, and in particular to mobile storage systems having sensors to prevent the closure of an aisle between two storage units when an obstacle is present in the aisle.

Mobile storage systems are widely used and well known to comprise a series of storage units which have shelves or bins, for example. Except for one or both of the end units, which may be stationary, each of the storage units will normally be movable, such as on rails, to create an access aisle between two of the units. As this aisle opens, the other units are positioned in close side-by-side relationship to minimize the overall floor space required for the units, moving together to do so. Especially in larger mobile storage units and systems, the carriages can be quite large, and the loads they carry quite heavy, such as steel or construction materials. It is commonly necessary, therefore, to provide motorized means for moving the units. These motorized moving means in turn require the use of means for preventing adjacent units from moving together when an obstacle, such as a person, is positioned between them, so as to avoid injury or damage.

In the past it has been customary to provide a sweep or safety switch bar for notifying the control system to inhibit motion of a storage unit if the bar encounters, while moving to close the aisle, an obstacle or impediment to movement, as shown for instance in U.S. Pat. Nos. 4,743,078 and 4,733,923. When such a structure is used alone to protect a person, however, the requirement of physical contact with the bar can be disconcerting and startling, which can make use of this structure alone undesirable. Use of a photoelectric sweep, as disclosed in U.S. Pat. No. 5,121,975, is only slightly less disconcerting, as the moving storage unit must still move quite close to a person before its motion is interrupted.

Another alternative is to use a "safety floor", such as set forth in U.S. Pat. Nos. 4,744,307 and 4,693,184, which disclose constructions of floor panels including safety switches. The weight of a person or other obstacle on one of the floor panels activates one of the safety switches, which notifies the control system to inhibit movement of the storage units. While these units work very well from a safety standpoint, they can be rather expensive, resulting in their non-use in certain situations. And U.S. Pat. No. 4,745,516 even discloses the use of a safety sweep and a safety floor in combination. Even this combination, however, may not properly sense that an obstacle remains in the aisle even though no switches are closed, such as on occasion may occur when a very light obstacle is in the aisle, or when a person needs to reach an item on a high shelf and may step onto a lower shelf to reach the item.

This invention relates to improvements to the structure set forth above, and to solutions to some of the problems raised or not solved thereby.

SUMMARY OF THE INVENTION

The present invention relates to a mobile storage system including at least a first movable storage unit with a prime mover adapted to move the shelving unit along a path of movement, and at least one blocking object, such as a second movable storage unit, a stationary storage unit or a wall positioned on the path. The invention provides a presence detector for detecting the presence of an obstacle in the path of movement and discontinuing movement of the first unit while the obstacle is in the path of movement. According to the invention, the presence detector includes at least one light source mounted to either the first unit or the blocking object so as to provide light into the path of movement. At least one light detector is mounted to the blocking object or first unit, respectively, opposite the light source. That is, if the light source is mounted to the first unit, the light detector will be mounted to the blocking object, and positioned to receive light from the light source, and vice versa. A control unit is connected to the light detector and receives a signal from the light detector, that signal indicating whether or not the light detector is receiving light from the light source. The control unit disables the prime mover from moving the first unit along the path when the signal is received from the light detector indicating that light is not being received from the light source. In turn, of course, the light detector not receiving light indicates that the obstacle is still in the path, so that the control unit refuses to permit the aisle to close when the obstacle is still in the path. The light detector and light source are most advantageously mounted substantially at the bottom of the first unit and the blocking object.

One embodiment includes a plurality of light detectors, and the control unit includes obstacle locating means for determining which of the light detectors if any is not receiving light from a light source. Generally the path between the movable shelving unit and the blocking object can be termed an aisle, open at one or both ends. According to the invention, the obstacle locating means uses the information about which of the light detectors is not receiving light to determine where along the aisle the light detectors are not receiving light from the light sources. This information is useful to continue the disablement of the prime mover, even though light is again received by all of the light detectors, unless the last position where the light detectors were not receiving light was within a predetermined distance from the end of the aisle. That is, for example, if the last position where the detectors were not receiving light was in the middle of the aisle, and suddenly all the detectors are receiving light again, this means that a person or other obstacle may still be in the aisle, but out of the line of sight of the detectors. The primary example where this situation could occur would be when the obstacle is for some reason between the detectors, but obviously still in the aisle. Another example would be when a person needs to reach an item on a high shelf and steps onto a lower shelf to reach the item.

Other objects and advantages of the invention will become apparent hereinafter.

DESCRIPTION OF THE PREFERRED EMBODIMENT

Figure 1:
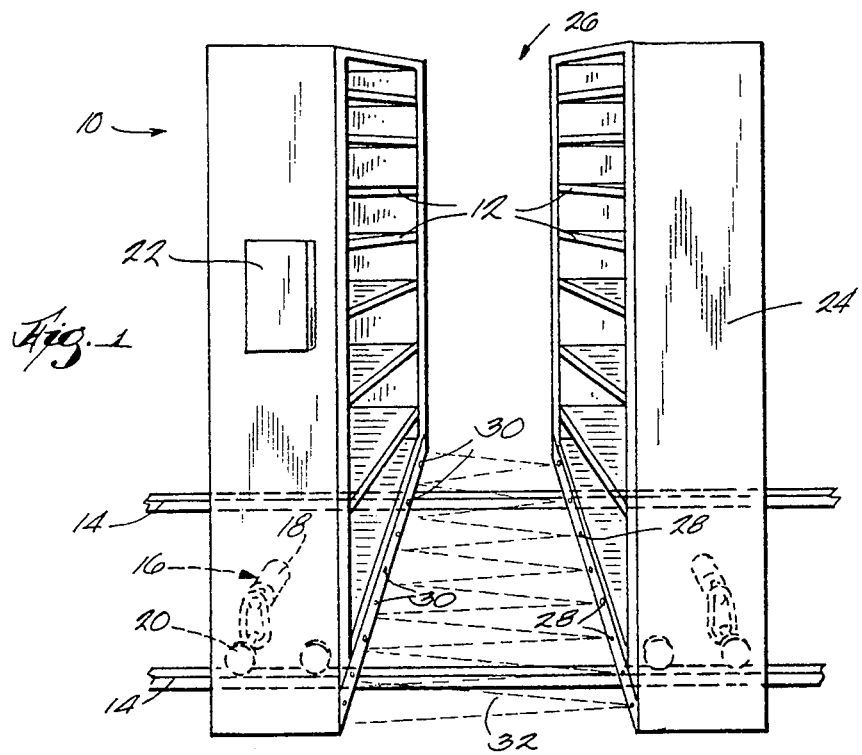
FIG. 1 is a perspective view of a mobile storage system including a presence detector constructed according to a preferred embodiment of the invention.

Referring now to FIG. 1, there is shown a mobile storage unit 10, including several shelves 12. The storage unit 10 is moved along a set of rails 14 by a prime mover 16, such as an electric motor 18 connected to a drive wheel 20 which runs along at least one of the rails. A control unit 22 is provided for determining the rate and direction of movement of the motor 18 and drive wheel 20, and also for determining whether it is safe for the storage unit 10 to move at all.

The limit of movement of the mobile storage unit 10 is a blocking object 24, such as a second mobile storage unit as shown in FIG. 1. The blocking object 24 could just as easily be a stationary storage unit, or a blank wall, at the end of the row of mobile storage units. When the mobile storage unit 10 is spaced apart from the blocking object 24, as shown in FIG. 1, there is considered to be an aisle 26 between the two. As indicated earlier, it is conventional for any safety sweep and/or safety floor (not shown) to be connected to the control unit 22, so as to provide information to make the determination of whether it is safe to move, that is, whether there is any substantial obstacle in the aisle 26, or in the path of movement of the mobile storage unit 10, because of which the mobile storage unit should be prevented from moving. The present invention calls for that determination to be made in a different manner.

Figure 2:
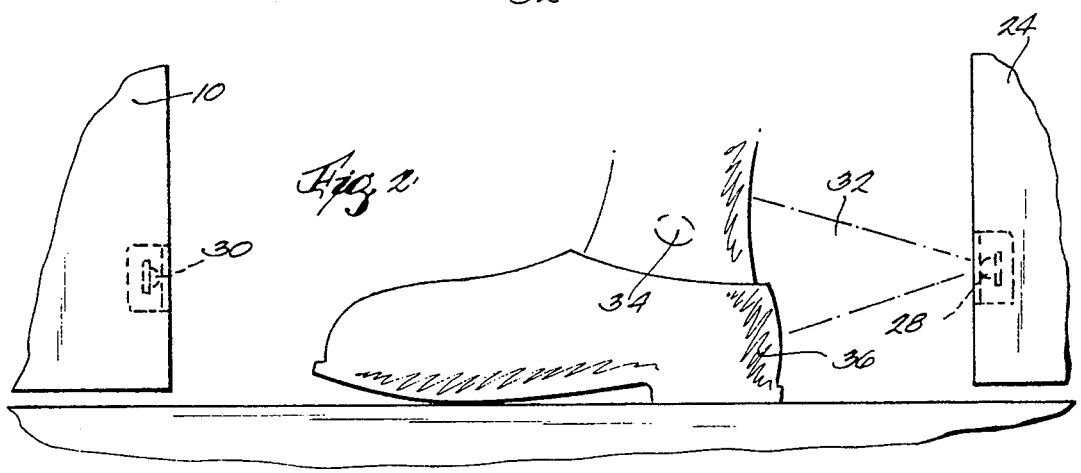
FIG. 2 is a side elevation view of a portion of the mobile storage system shown in FIG. 1, with a person's foot acting as an obstacle to the light from the light sources.

According to the present invention, at least one and preferably several light sources 28 are mounted to either the mobile storage unit 10 or the blocking object 24, directing light across the aisle 26 toward the other of the mobile storage unit and blocking object. Applicants have found the most desirable light source to be an infrared transmitter for several reasons, including the fact that the components are readily available and relatively inexpensive, power usage and response time are minimized, there is less interference from ambient light, and because infrared light is a more inconspicuous and unobtrusive type of light than visible light. In the embodiment shown in FIGS. 1 and 2, the light sources 28 are mounted to the blocking object 24. At least one and preferably several light detectors 30 are then mounted opposite light sources 28. In FIGS. 1 and 2 those detectors 30 are mounted to the mobile storage unit 10. The detectors 30 are connected to the control unit 22 so that, if any one of the detectors is screened from receiving light from any of the light sources, the control unit 22 prevents the prime mover from moving the storage unit 10.

As shown in FIGS. 1 and 2, the light sources 28 and light detectors 30 are mounted near the bottom of the mobile storage unit 10 and blocking object 24. This position was selected so that the beam 32 of light from the light sources 28 is broken or screened by the lowest part of a person's body, the ankle 34 or foot 36 (FIG. 2), and the lowest part of an obstacle of any other type. This positioning was selected of course because of the ubiquitous influence of gravity. That is, if an obstacle has fallen off a shelf, it will normally come to rest on the floor, and may not be detected if the light sources and detectors are not located near the floor. A person's weight will normally be borne by the floor when that person is in the aisle. The floor is simply the lowest plane for supporting any potential obstacle.

The control unit 22 includes circuitry or discerning means to determine which of the detectors 30 is not receiving light from the light sources 28. Since the fact that one of the detectors 30 is not receiving light means that the prime mover is disabled from moving the unit 10, the information as to which detector was last screened can be used to continue the disablement of the prime mover even though no detector is currently being screened, if the last detector to be screened was not within a predetermined distance from the end of the aisle 26. That is, for example, if the last position where the detectors were not receiving light was in the middle of the aisle, and suddenly all the detectors are receiving light again, this means that a person or other obstacle may still be in the aisle, but out of the line of sight of the detectors. This type of situation could most likely occur, for example, when the obstacle is for some reason between the detectors, but obviously still in the aisle. This situation could also occur when a person needs to reach an item on a high shelf and steps onto a lower shelf to reach the item. The person would thus lift himself above the line of sight between the light sources 28 and the detectors 30, but still be positioned in the aisle between the movable storage unit 10 and the blocking object 24. The person would not want the aisle to begin to close at that time.

In one arrangement used by applicants, the light sources 28 and light detectors 30 are placed every three inches along the length of the blocking object 24 and movable storage unit 10, respectively. If the detectors 30 which were last screened are within two feet of either end of the aisle 26, the prime mover 16 would be enabled to move the unit 10 and close the aisle. If the detectors 30 which were last screened are more than two feet from either end of the aisle, the prime mover would continue to be disabled until the detectors were again screened, or the control unit reset by some other means.

Figure 3:
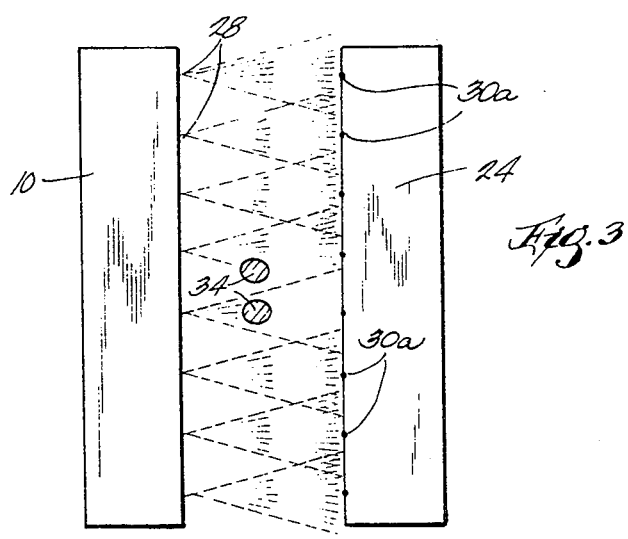
FIG. 3 is a top view of a mobile storage system constructed according to a different embodiment of the invention, wherein the light sources and light detectors are reversed.

FIG. 3 shows a different embodiment, wherein the mounting of the light sources 28 and light detectors 30 is reversed from that shown in FIGS. 1 and 2. That is, in the embodiment shown in FIG. 3, the light sources 28 are mounted to the movable unit 10 and the light detectors 30, represented in top view by dots 30a, are mounted to the blocking object 24. This embodiment shows that the light sources 28 and light detectors 30 can be on either the movable unit 10 and blocking object 24, respectively, or vice versa. In fact, of course, if the blocking object 24 is another movable storage unit as referred to above, both the sources and the detectors are on movable storage units, facing opposite. As with the embodiment shown in FIGS. 1 and 2, the person's ankles 34 are shown screening the light detectors from the light sources.

Accordingly, the invention provides improved functionality over prior art sweeps and safety floors, even the photoelectric sweep disclosed in U.S. Pat. No. 5,121,975, referred to above.

While the apparatus hereinbefore described is effectively adapted to fulfill the aforesaid objects, it is to be understood that the invention is not intended to be limited to the specific preferred embodiment of cross-aisle photo-detector for mobile storage systems set forth above. Rather, it is to be taken as including all reasonable equivalents within the scope of the following claims.

We claim:

1. In a mobile storage system including at least a first movable storage unit with a prime mover adapted to move the shelving unit along a path of movement, and at least one blocking object, such as a second movable storage unit, stationary storage unit or wall positioned on said path, a presence detector for detecting the presence of an obstacle in said path of movement and discontinuing movement of the first unit while the obstacle is in said path of movement, said presence detector comprising:
   at least one light source mounted to one of said first unit and said blocking object so as to provide light into said path of movement;
   at least one light detector mounted to the other of said first unit and said blocking object, and positioned to receive light from said at least one light source; and
   a control unit connected to said light detector and receiving a signal from said light detector, said signal indicating whether or not said light detector is receiving light from said light source, said control unit disabling said prime mover from moving said movable shelving unit along said path when said signal is received from said light detector indicating that light is not being received from said light source, which in turn indicates that said obstacle is in said path.

2. The combination of claim 1 wherein said light detector and said light source are mounted substantially at the bottom of said first unit and said blocking object.

3. The combination of claim 1 further comprising a plurality of light detectors, and wherein said control unit includes discerning means for determining which of said light detectors if any is not receiving light from said at least one light source.

4. The combination of claim 3 wherein said path between said movable shelving unit and said blocking object is an aisle having at least one end, and wherein said discerning means uses said information about which of said light detectors is not receiving light to determine where along the aisle said light detectors if any are not receiving light from said at least one light source.

5. The combination of claim 4 wherein said control unit does not re-enable said prime mover once said prime mover is disabled, even though light is again received by all of said light detectors, unless the last position where said light detectors were not receiving light was within a predetermined distance from the end of the aisle.

6. The combination of claim 1 wherein said light source transmits infrared light.

7. A mobile storage system comprising:
   at least a first movable storage unit;
   a prime mover adapted to move said storage unit along a path of movement;
   at least one blocking object, such as a second movable storage unit, stationary storage unit or wall, positioned on said path;
   at least one light source mounted to one of said first unit and said blocking object so as to provide light into said path of movement;
   at least one light detector mounted to the other of said first unit and said blocking object, positioned to receive light from said at least one light source; and
   a control unit connected to said light detector and receiving a signal from said light detector, said signal indicating whether or not said light detector is receiving light from said light source, said control unit disabling said prime mover from moving said movable shelving unit along said path when said signal is received from said light detector indicating that light is not being received from said light source.

8. A mobile storage system as recited in claim 7 wherein said light detector and said light source are mounted substantially at the bottom of said first unit and said blocking object.

9. A mobile storage system as recited in claim 7 further comprising a plurality of light detectors, and wherein said control unit includes discerning means for determining which of said light detectors if any is not receiving light from said at least one light source.

10. A mobile storage system as recited in claim 9 wherein said path between said movable shelving unit and said blocking object is an aisle having at least one end, and wherein said discerning means uses said information about which of said light detectors is not receiving light to determine where along the aisle said light detectors if any are not receiving light from said at least one light source.

11. A mobile storage system as recited in claim 10 wherein said control unit does not re-enable said prime mover once said prime mover is disabled, even though light is again received by all of said light detectors, unless the last position where said light detectors were not receiving light was within a predetermined distance from the end of the aisle.

12. The combination of claim 7 wherein said light source transmits infrared light.

13. A mobile storage system comprising:
   at least a first movable storage unit;
   a prime mover adapted to move said storage unit along a path of movement;
   at least one blocking object, such as a second movable storage unit, stationary storage unit or wall, positioned on said path;
   at least one light source mounted to one of said first unit and said blocking object so as to provide light into said path of movement;
   a plurality of light detectors mounted to the other of said first unit and said blocking object, along the length thereof, positioned to receive light from said at least one light source; and
   a control unit connected to said light detector and receiving a signal from said light detector, said signal indicating whether or not said light detector is receiving light from said light source, said control unit disabling said prime mover from moving said movable shelving unit along said path when said signal is received from said light detector indicating that light is not being received from said light source;
   said control unit including discerning means for determining which of said light detectors if any is not receiving light from said at least one light source.

14. A mobile storage system as recited in claim 13 wherein said path between said movable shelving unit and said blocking object is an aisle having at least one end, and wherein said discerning means uses said information about which of said light detectors is not receiving light to determine where along the aisle said light detectors if any are not receiving light from said at least one light source.

15. A mobile storage system as recited in claim 13 wherein said control unit does not re-enable said prime mover once said prime mover is disabled, even though light is again received by all of said light detectors, unless the last position where said light detectors were not receiving light was within a predetermined distance from the end of the aisle.

16. A mobile storage system as recited in claim 13 wherein said light detector and said light source are mounted substantially at the bottom of said first unit and said blocking object.

17. The combination of claim 13 wherein said light source transmits infrared light.

* * * * *